UNITED STATES PATENT OFFICE.

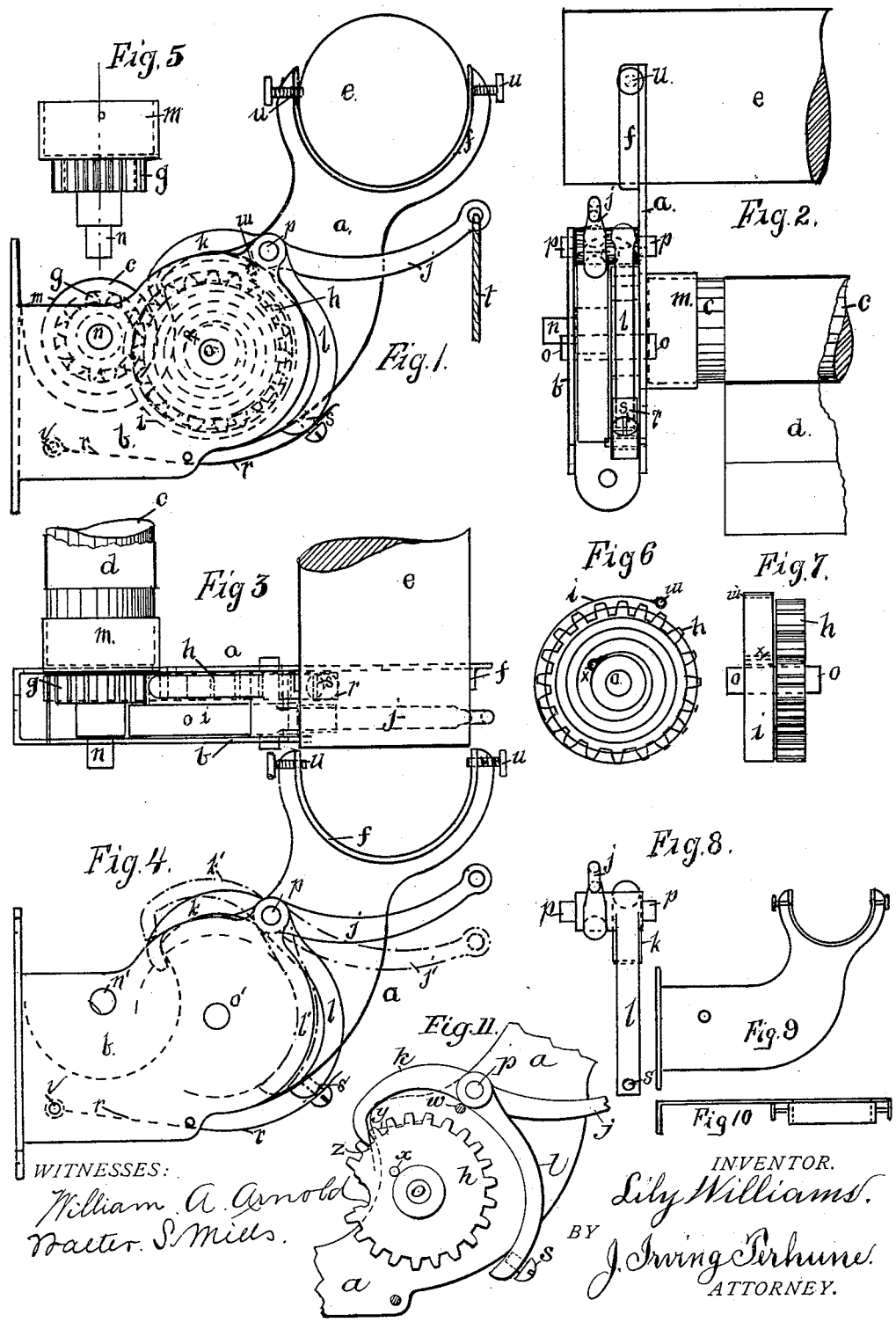

LILY WILLIAMS, OF LAKE VIEW, NEW JERSEY.

SHADE OR CURTAIN FIXTURE.

SPECIFICATION forming part of Letters Patent No. 626,742, dated June 13, 1899.

Application filed October 17, 1898. Serial No. 693,779. (No model.)

*To all whom it may concern:*

Be it known that I, LILY WILLIAMS, a citizen of the United States, residing at Lake View, in the county of Passaic and State of New Jersey, have invented a new and useful Improvement in Shade or Curtain Fixtures, of which the following is a specification.

My invention relates to improvements in fixtures for shade and curtain rollers in which the shade-roller is operated by a spring in conjunction with a pawl and brake and fixture supporting a pole for a curtain.

The objects of my improvements are, first, to provide a means for operating a shade by an arrangement which can be applied to the end of an ordinary shade-roller and which will not as easily get out of order as and can be more easily repaired than those at present in use; second, the means of operating the same, and, third, a shade-roller bracket which also acts as a support for a curtain-pole. I attain these objects by the mechanism illustrated in the accompanying drawings, in which—

Figure 1 represents a side view of my improvement with a shade, roller, and curtain-pole in place. Fig. 2 is a front view of Fig. 1 with the shade on the roller. Fig. 3 is a plan of Fig. 1 looking from the top. Fig. 4 shows a side view of a bracket or case with the two positions of lever, pawl, and brake. Fig. 5 is a detailed view of the small gear and a cap for receiving the roller. Fig. 6 represents a side view of the large gear with the spring and axle in place. Fig. 7 is an edge view of Fig. 6. Fig. 8 is a detailed end view of lever, pawl, and brake on the one axle. Figs. 9 and 10 represent a side and ground plan of bracket for supporting the other end of the roller and pole, drawn on a small scale. Fig. 11 represents an enlarged detailed view showing the pawl, brake, and lever, and the gear, and the construction of the end of the pawl and its relation to the teeth of the gear.

Similar letters refer to similar parts throughout the several views.

The bracket consists of two members $a$ and $b$, connected at their rear ends, one of these members, $a$, being extended beyond the other to form a pole-support. This bracket is secured to the window-casing and supports the one end of the shade-roller by means of the sleeve $m$, of which the gear $g$ and the bearing $n$ is a part, as shown in Fig. 5. The bracket also contains the larger gear $h$ and spring $i$, as shown in Figs. 6 and 7, and lever $j$, pawl $k$, and brake $l$. The side $a$ is flanged at $f$ and has screws $u$, which hold the curtain-pole $e$. To a hub on the shaft or axle $o$ there is a spring $i$, with one end secured at $x$ and coiled around the hub and the other end secured to the bracket by a wire $w$. Beside the hub with the spring on the same axle the gear $h$ is secured, which is in driving contact with the gear $g$ on the sleeve $m$, which can be placed over the end of any ordinary shade-roller, and when the end $n$ has been inserted in the side of the bracket the top of the gear $h$ is kept from revolving to the right by the hooked shape of the end of the pawl $k$ fitting in the gear $h$; but when the shade $d$ is drawn down by taking hold of the same the gear $h$ then turns in the opposite direction—i. e., the top of the gear then turns to the left. The slope of the inside of the hooked point of the pawl and its point of contact with the gear being to one side of a vertical from the center of the gear $h$ permits the hook of the pawl to drag over the teeth of the gear $h$ without lifting the pawl by means of the lever and cord $t$. The point and angle of contact between the end of the pawl and the teeth of the gear $h$ are indicated by the line $y$ and the slope of the end of pawl $z$, as shown in Fig. 11.

The pawl $k$, lever $j$, and brake $l$ are each secured at one of their ends on the same axle $p$. Hence they all move at the same time.

The brake $l$ is in the shape of a segment of a circle, which circle corresponds to the circumference of the gear $h$. When the lever $j$ is drawn down far enough, the brake $l$ bears on the face of the gear $h$ and when pressed hard enough retards and controls the revolutions of the gear and the shade. The pawl $k$ is raised sufficiently to release the gear by drawing down on the lever-cord $t$; but to apply the brake the weight of the pull on the lever $j$ has to be increased.

The spring $r$ in Figs. 1 and 4 is nearly a straight spring and is fastened at one end at $v$ and rests near its center on a small wire or pin in the bottom of the bracket and has its other end drawn inward and held to the end of the brake $l$ by the screw $s$. Its inclination to straighten out gives the brake $l$ its outward tendency, which in turn gives the pawl $k$ its tendency to enter the teeth of the gear $h$ and to keep the lever $j$ at its highest point.

The pole $e$, on which the curtain is hung, is secured in its place by screws $u$ and flanged sides $f$ of the one side $a$ of the bracket.

In Fig. 4 when the lever $j$ is drawn down it moves with it pawl $k$ and brake $l$ to the dotted positions marked, respectively, $j'$ $k'$ $l'$.

When the shade $d$ is up or near to roller $c$, the spring $i$ is extended to its fullest, or thereabout. When the shade is drawn down, the spring $i$ is wound on the hub on the axle $o$ by the gear $h$ in connection with the gear $g$ on end of shade-roller $c$ and is held there by the pawl $k$, which enters between the teeth of the gear $h$ by means of the spring $r$.

When it is desired to raise the shade, the string $t$ on the end of lever $j$ is drawn down, which causes the pawl to release the gear $h$, which is connected to the spring. The shade $d$ would be wound up very rapidly, but is retarded by drawing farther down on the lever $j$, so as to cause the brake $l$ to press against the face of the gear $h$ in sliding contact. Thus the shade is wound up as the spring unwinds and the reverse. This arrangement makes a very neat, economical, and durable shade and curtain-pole fixture.

Having thus described my invention, what I claim, and desire to secure by Letters Patent, is—

In a self-acting shade-roller, the combination with the roller and brackets for mounting the same, of means for automatically rotating the roller, consisting of a spring and gear mounted in one of said brackets, a pawl and brake rigidly united and pivoted to the bracket so that said pawl and brake may engage said gear, and a lever connected to said pawl and brake, and adapted to bring them alternately into contact with the gear, substantially as set forth and described.

Signed at Lake View, in the county of Passaic and State of New Jersey, this 1st day of October, A. D. 1898.

LILY WILLIAMS.

Witnesses:
WILLIAM A. ARNOLD,
WALTER S. MILLS.